United States Patent [19]

Koch

[11] Patent Number: 4,646,463

[45] Date of Patent: Mar. 3, 1987

[54] FISHING DEVICE WITH GRAVITY ACTIVATED DIVERTER

[76] Inventor: Alexander W. Koch, P.O. Box 5278, Aloha, Oreg. 97007

[21] Appl. No.: 841,138

[22] Filed: Mar. 19, 1986

Related U.S. Application Data

[63] Continuation-in-part of Ser. No. 803,440, Dec. 2, 1985, abandoned.

[51] Int. Cl.$^4$ ............................................. A01K 95/00
[52] U.S. Cl. ..................................... 43/43.13; 43/42.31
[58] Field of Search ................ 43/43.13, 42.31, 42.22, 43/42.35, 42.11, 42.19, 42.25, 42.06, 42, 42.03

[56] References Cited

U.S. PATENT DOCUMENTS

| | | | |
|---|---|---|---|
| 1,857,939 | 5/1932 | Cameron | 43/42.31 |
| 2,183,059 | 12/1939 | Bacon . | |
| 2,229,369 | 1/1941 | Buettner | 43/42.06 |
| 2,560,733 | 7/1951 | Morris | 43/42.06 |
| 2,691,841 | 10/1954 | Daniel | 43/42.06 |
| 2,718,725 | 9/1955 | Thurman | 43/42.31 |
| 3,003,276 | 10/1961 | Patterson . | |
| 3,040,465 | 6/1962 | Gierat | 43/42.31 |
| 3,044,207 | 7/1962 | Dorsett | 43/42.22 |
| 3,449,852 | 6/1969 | Mitchell | 43/42.31 |
| 3,585,749 | 6/1971 | Dieckmann . | |
| 3,626,628 | 12/1971 | Weimer . | |
| 3,979,853 | 9/1976 | Storm et al. . | |
| 4,155,191 | 5/1979 | Spivey | 43/42.31 |
| 4,161,078 | 7/1979 | Pagani | 43/43.13 |
| 4,287,679 | 9/1981 | Klotz | 43/42.31 |
| 4,483,091 | 11/1984 | Norlin . | |

*Primary Examiner*—M. Jordan
*Attorney, Agent, or Firm*—Eugene M. Eckelman

[57] ABSTRACT

A body member has a first passageway extending transversely thereof adjacent the forward end and opening through the side surfaces of the body member. A second passageway opens in from the front and communicates with the first passageway at a point intermediate the sides of the body member. A flap valve is provided on each side surface and is hinged at its forward end relative to the side openings to allow only outward flow of water from the transverse passageway through the sides. A ball is freely movable in the transverse passageway and is associated with its flap valves for controlling outward flow of water through one or the other of the flap valves depending upon the position of the ball resulting from gravitational or side thrust forces acting on the body member. The movement of the ball relative to the valves causes unbalanced water pressure discharging through one or the other of the side openings to cause the body member to change directions and swim in a darting pattern similar to a minnow. In a second embodiment a shiftable weight is provided as well, to control diving forces of the body member.

11 Claims, 8 Drawing Figures

U.S. Patent  Mar. 3, 1987  Sheet 1 of 2  4,646,463
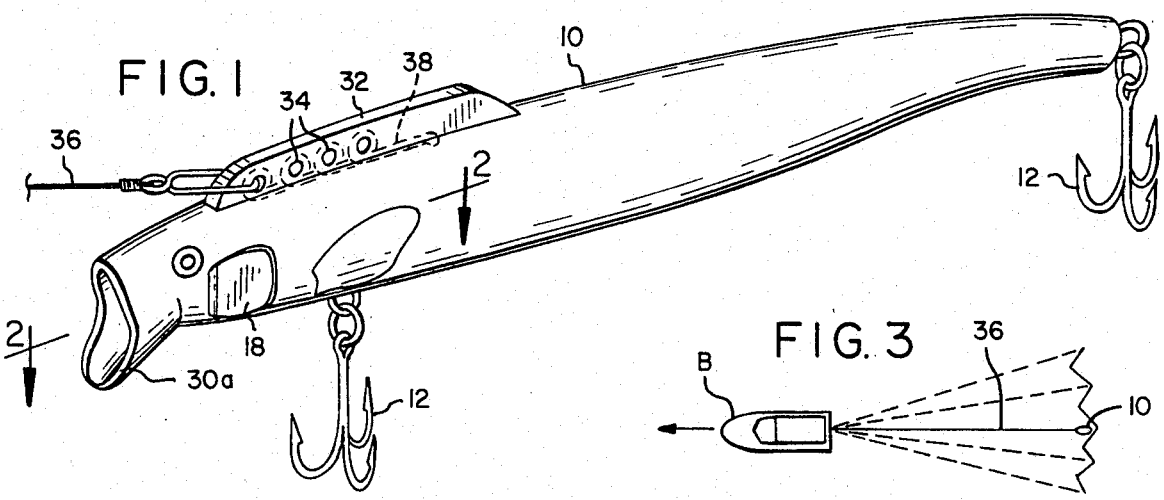
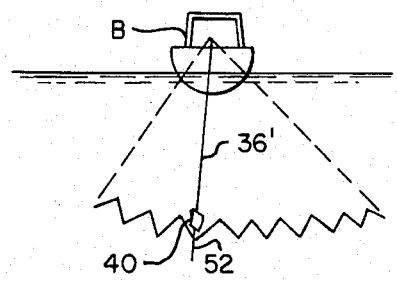
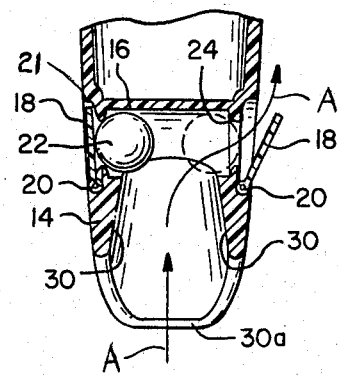
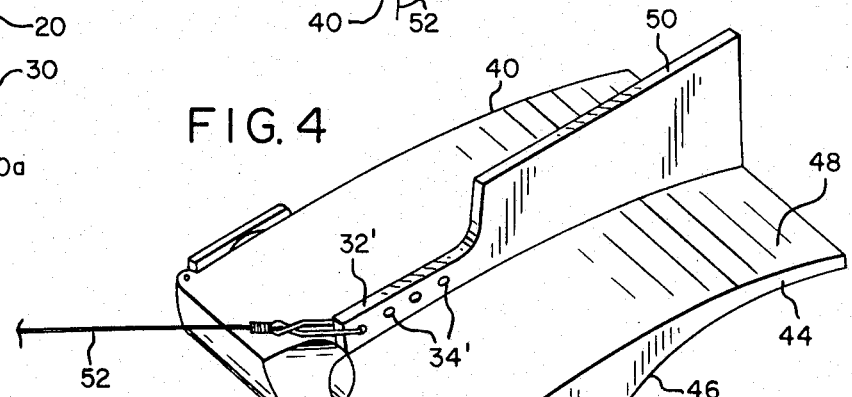
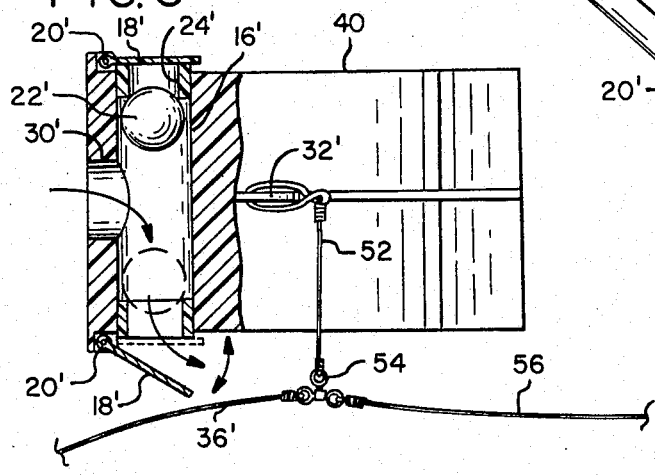

4,646,463

FISHING DEVICE WITH GRAVITY ACTIVATED DIVERTER

REFERENCE TO PRIOR APPLICATIONS

This application is a continuation-in-part of application Ser. No. 803,440, filed Dec. 2, 1985 now abandoned.

BACKGROUND OF THE INVENTION

This invention relates to fishing devices utilizing a gravity activated diverter for imparting irregular swimming motions to the fishing device.

Various devices have heretofore been used in lure form to attract fish. Lures for example as shown in U.S. Pat. No. 2,183,059 utilize a bent body portion to provide a wiggling motion when drawn through the water. Other types of structures such as shown in U.S. Pat. Nos. 3,585,749, 3,626,628 and 4,483,091 employ internal reversing mechanisms to cause steering from side to side to impart a zig zag motion to the device in the water. All of these devices, and others, are designed primarily to resemble a minnow swimming in the water since minnows are a major food source for the larger fish. It is well established that these various actions which simulate the swimming pattern of a minnow increase the possibility of attracting and catching fish.

SUMMARY OF THE INVENTION

A primary objective of the present invention is to provide improvements in the fishing art wherein a gravity activated diverter valve structure is applied to lures, lure guides and divers which causes them to swim in an irregular pattern to simulate the swimming pattern of a minnow. At the same time, the present structure causes or allows the fishing device to move in a wide area from side to side.

A more particular object is to provide a novel gravity activated diverter valve mechanism in the form of a ball which operates in a valve chamber in the front of a fishing device and which under control of the pole line and wave action causes the fishing device to swim in an irregular pattern and also from side to side, and when applied to a lure diver, such device also darts up and down.

A further object is to provide a shiftable weight in combination with the present fishing device to vary the depth of dive.

In carrying out the objectives of the invention, a body member is provided with a first passageway extending transversely thereof a short distance rearwardly of the forward end and opening through the side surfaces of the body member. A second passageway extends in from the forward end of the body member and communicates with the second passageway at a point intermediate the sides of the body member. A combination check and flap valve is provided on each side surface. The flap valve is hinged at a forward point relative to the side opening and allows only outward flow of water from the transverse passageway through the sides. A ball is disposed in the transverse passageway and is associated with the flap valves for controlling the outward flow of water through one or the other of the valve assemblies depending upon the positioning of the ball resulting from gravitational or side thrust forces acting on the body member. The movement of the ball relative to the valves causes unbalanced water pressure at one or the other of the side surface openings to cause the body member to change direction in an irregular movement. Pole line connecting means are provided on the top forward portion of the body member to control direction of movement and diving capabilities. The device may be shaped like a minnow, including forming the flap valves at the sides to resemble gills. Also, the forward opening in the body member can be enlarged and made to resemble an open mouth of a minnow. Also within the concept of the invention is a shiftable weight attached to the device for providing the fisherman with a great number of dive choices.

The invention will be better understood and additional objects and advantages will become apparent from the following description taken in connection with the accompanying drawings.

BRIEF DESCRIPTION OF THE DRAWINGS

FIG. 1 is a perspective view of a fish lure embodying principles of the present invention;

FIG. 2 is an enlarged fragmentary sectional view taken on the line 2—2 OF FIG. 1;

FIG. 3 is a top plan view showing diagrammatically a representative pattern of movement of the lure behind a boat;

FIG. 4 is a perspective view of a combination lure guide and diver embodying principles of the present invention;

FIG. 5 is a top plan view of the device of FIG. 4, this view being partly broken away to show internal structure;

FIG. 6 is a diagrammatic rear view of a boat and the device of FIG. 4 showing a form of action of the device of FIG. 4 when submerged;

DETAILED DESCRIPTION OF PREFERRED EMBODIMENTS

Figure 7:
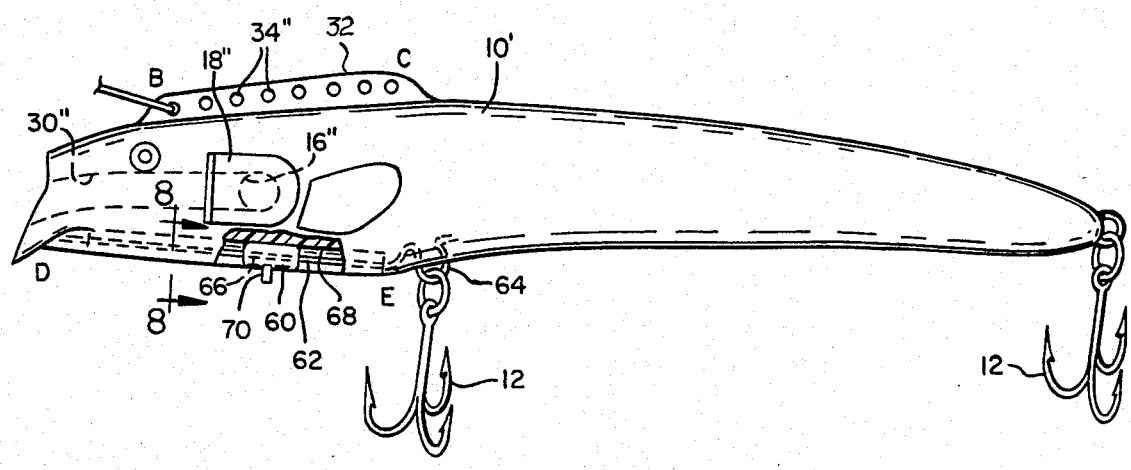
FIG. 7 is a side elevation of a fish lure similar to the lure of FIG. 1 but combined with additional dive control means.

The present invention can be applied to various types of fishing devices such as fish lures, guides and divers. FIGS. 1, 2 and 3 show application of the invention to a fish lure 10 resembling a minnow. The lure has the usual fish hooks 12 depending from the bottom thereof. According to the invention, a forward portion of the lure has a solid molded portion 14 or other suitable structure in which a cross or transverse passageway 16 can be formed. This passageway opens through both sides of the lure and the openings thereof are associated with flap valves 18 hingedly supported at a front vertical pivot point 20. These valves serve as check valves, allowing water flow in one direction, namely, from the passageway outwardly. In a preferred arrangement, valves 18 are set in recesses 21 so as to be protected from damage that could result by a fish striking the lure. A ball 22 is freely movable in the transverse passageway 16 and is associated with valve seats 24 on each side of a structure forming a seat for the ball and a reasonably good seal for the flap valves 18. One side of the seats is engageable by the ball and the other side is engageable by its flap valve.

A second passageway 30 is provided which extends longitudinally inwardly from the front of the lure and communicates with the transverse passageway 16 intermediate the ends of the latter. Upon forward movement of the lure, water thus can flow in through passageway 30 and out the side of the passageway 16 which is not under the influence of the ball 22, as shown by the arrows A in FIG. 2. The ball is arranged to roll freely by gravity in the passageway 16 and as will be discussed hereinafter, the movement of the ball from side to side controls the forward direction of movement of the lure.

A fin-like projection 32 is provided on the top of the lure rearwardly of the front and has a plurality of apertures 34 arranged for connection to a pole line 36. The attachment of the pole line to selective ones of the apertures will determine the amount of dive that the lure will have in the water, the farther back the attachment of the pole line in the apertures the greater the dive. Reinforcing wire 38 is molded in the projection 32 and body portion to allow the projection 32 to withstand the pull of a fish.

In the application of the invention to the embodiment of FIG. 1, the body member 10 is formed in the shape of a minnow to provide an attraction for larger fish. In addition, the flap valves 18 are in the position of fish gills and in fact can be shaped like a gill. The front opening 30a of the longitudinal passageway 30 is widened to resemble an open mouth of a minnow. In addition, the top projection 32 takes the appearance of a fin.

When cast out in the water in the operation of the lure, the various movements of the body member 10 will cause the ball to move back and forth whereby the change in water direction out the sides of the passageway will cause the lure to swim in an irregular motion, namely, to dart to and fro. That is, with the ball on one side, the water can flow from the other side through the flap valve and since the other flap valve closes off the opposite side from incoming water, the flow of water through the passageway will apply unbalanced forces to the body member and cause it to change direction. Any type of wave action or pull on the pole line will cause the ball to move either by side forces or by gravity, and such darting action occurs.

Also, the lure can be thrown out to the side of a boat wherein the drag from the pole line acting on the projection 32 on top of the lure will cause it to tip whereby the ball will roll to the low side and water which then flows out the opposite side causes a change in direction. In this side casting procedure and with any wave or pole action, the lure will move irregularly back and forth while making an over-all transverse movement. The top plan view of FIG. 3 shows a side casting pattern wherein the lure will automatically move from the side to a point directly behind the boat while making its irregular pattern.

The same concept of the invention is applicable to a lure guide or diver 40, in FIGS. 4, 5 and 6. The device 40 is illustrated as a combination lure guide and diver but it is to be understood that the concept of the invention can be applied to a guide alone.

The body member 40 similarly has a first or transverse passageway 16', a second or longitudinal passageway 30' opening at the front and the similar arrangement of flap valves 18', front hinges 20' therefor, ball member 22', and seat members 24'. The device has a top line connecting projection 32' with a plurality of holes 34' for connection to a pole line 36'. Although the shape of the body member in plan is illustrated as being rectangular, it can be of any selected shape. In side elevation, the body member has a rounded and thickened forward portion 42 which convexly curves rearwardly into a thinned tail portion 44 having a lower concave surface 46 joining with the convexly shaped portion 42. The top surface 48 of the body member 40 is convexly shaped and parallels the bottom concave surface to form the gently turned down tail portion 44. A central upright vane 50 extends rearwardly from the line attaching means 32'.

The pole line 36' is attached to the guide 40 as shown in FIGS. 4 and 5, with a line 52 extending from a swivel connection 54 on the pole line in turn connected to a leader 56 extending to a conventional lure. The darting or irregular motion of the guide 40 is the same as that described in connection with the lure embodiment of FIG. 1, with the connection between the guide and the lure being close enough such that the lure will follow the pattern of movement through the water that the guide takes.

The shape of the guide 40 also makes it a diver with irregular up and down movements as well as the irregular side movements. The buoyancy of the device is such that it will barely float, and depending upon the attached position of the line 36' therewith it can be made to dive shallow or deep. The thickened rounded front portion 42 and the downwardly bent shape of the tail 44 causes the tail to flip up and down at the slightest line pull or wave action, and thus the up and down irregular movement. When the line is connected to the forward holes 34' the device will swim shallow and the tail will flop up and down to also cause an attraction. When the line is connected to rearward holes, there will be little or no flopping up and down and the device will dive. At the same time, the diverter valve assembly at the front causes it to work in irregular side to side movement the same as that shown in connection with the lure in FIG. 3. FIG. 6 is a view taken from the rear of a boat B showing a side to side and up and down irregular movement which the combination guide and diver 40 will accomplish.

Figure 8:
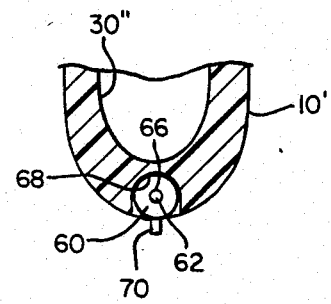
FIG. 8 is an enlarged fragmentary cross sectional view taken on the line 8—8 of FIG. 7.

With reference to FIGS. 7 and 8, an embodiment of the invention is illustrated which adds descending and ascending capabilities to the present device. This embodiment is illustrated in combination with a lure 10' as in FIG. 1 and similarly employs a transverse passageway 16", a longitudinal passageway 30" extending in from the mouth and communicating with the passageway 16", side flap valves 18", a ball valve, not shown, in the passageway associated with side seats, also not shown, and a line connecting projection 32" having line connecting apertures 34".

In this embodiment, a weight 60 is mounted on a longitudinally extending bar 62 at the front and bottom of the lure. This bar has suitable integral support on the lure such as attachment between the open lower jaw of the lure and an eye 64 for the hook 12. The weight 60 has a longitudinal bore 66 for mounted support on the bar and also has guided movement in a longitudinal recess 68 provided in the bottom surface of the body of the lure. The bar 62 and weight are concealed in the recess 68 for protection. The weight has a snug fit on the bar and also in the recess 68 in an arrangement such that while it can be manually forced to selected positions, it will stay where it is set through casting operations and the force of water thereagainst when in the water. The weight has a depending finger tab 70 for manual adjustment thereof.

In addition to the lure having the darting action described in connection with FIG. 1, the descending and ascending capabilities can be adjusted to many patterns and more controllable than that described in connection with FIG. 1 by merely shifting the line connection in the apertures 34″ and shifting the weight 62 along the bar. A greater number of apertures are provided than those shown in FIG. 1 to provide precise diving action, namely, by changing the center of balance longitudinally changes the attitude of the lure during its swimming action.

Reference points B, C, D, and E are provided on the drawing for the apertures 34″ and the weight 60, respectively, to illustrate the following lure actions. If the fish line is attached to point B and the weight shifted to point E, the lure will nose up and splash and roll on the surface. If the weight is moved to point D with the line still attached to point B, the lure will sporadically make a shallow dive and roll. If the line is connected to point C, then the deep diving position is in force and shifting the weight will change the deep dive pattern. By selected line connection in apertures 34″ and selected weight positioning, many swimming patterns are achievable.

The improved action produced by the present diverter valve assembly simulates the irregular darting action of a minnow and provides an attraction to larger fish. Also, the minnow-like appearance of the lure of FIG. 1 provides an even greater attraction, namely, the shape of the body, the open mouth 30a the gill shaped flap valves 18, and the fin-resembling line connecting portion 32.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A fishing device comprising
   a body member having forward and rearward ends and top, bottom and side surfaces,
   a first passageway extending transversely of said body member adjacent said forward end and opening through the side surfaces of said body member,
   a second passageway opening at the forward end of said body member and leading rearwardly into communication with said first passageway at a point intermediate the sides of said body member,
   a valve on each side surface at said side openings allowing outward flow of water from said transverse passageway through the sides but restricting inward flow,
   line connecting means on said body member arranged to be connected to a pull line,
   and a ball freely movable in said transverse passageway associated with said valves for controlling outward flow of water through one or the other of said valves at a time depending upon the positioning of said ball resulting from gravitational or side thrust forces acting on said body member,
   the movement of said ball relative to said valves causing unbalanced water pressure discharging through one or the other of said side surface openings to cause said body member to change directions.

2. The fishing device of claim 1 wherein said line connecting means is on the top forward portion of said body member whereby side tension forces of the pole line influence the direction of movement of said body member in the water.

3. The fishing device of claim 2 wherein said line connecting means comprises a plurality of line attaching points spaced longitudinally of said body member whereby to control the diving forces of the pole line applied to the body member.

4. The fishing device of claim 1 wherein said body member is shaped similar to a minnow.

5. The fishing device of claim 1 wherein said body member is shaped similar to a minnow, said valves at the sides comprising flap valves and being shaped to resemble gills of a fish.

6. The fishing device of claim 1 wherein said body member is shaped similar to a minnow, said valves at the sides comprising flap valves and being shaped to resemble gills of a fish and said forward opening of said second passageway being enlarged to resemble an open mouth of a minnow.

7. The fishing device of claim 1 wherein said body member comprises a guide for a fish lure tied thereto.

8. The fishing device of claim 7 wherein said line connecting means comprises a plurality of line attaching points spaced longitudinally of said body member whereby to control the diving forces of the pole line applied to the body member.

9. The fishing device of claim 7 wherein said line connecting means comprises a plurality of line attaching points spaced longitudinally of said body member whereby to control the diving forces of the pole line applied to the body member, said body member having a contoured bottom surface arranged to cause said body member to dive to selected depths depending upon the attaching point of the pole line thereon.

10. The fishing device of claim 7 wherein said line connecting means comprises a plurality of line attaching points spaced longitudinally of said body member whereby to control the diving forces of the pole line applied to the body member, said body member having a top to bottom rounded and thickened portion at the front leading rearwardly to a thinned rearward portion having a concaved lower surface.

11. The fishing device of claim 1 including recesses in the side surfaces of said body member for receiving said flap valves to protect said valves from damage resulting by a fish striking the device.

* * * * *